United States Patent [19]

Matsumoto

[11] Patent Number: 5,372,241
[45] Date of Patent: Dec. 13, 1994

[54] AUTOMATIC CARRIER SYSTEM AND AUTOMATIC CARRIER METHOD

[75] Inventor: Hajime Matsumoto, Itami, Japan

[73] Assignee: Mitsubishi Denki Kabushiki Kaisha, Tokyo, Japan

[21] Appl. No.: 963,924

[22] Filed: Oct. 20, 1992

Related U.S. Application Data

[63] Continuation of Ser. No. 625,728, Dec. 4, 1990, abandoned.

[30] Foreign Application Priority Data

Mar. 9, 1990 [JP] Japan .................. 2-59319

[51] Int. Cl.$^5$ ............................. B65G 47/34
[52] U.S. Cl. .................. 198/465.4; 198/463.2; 414/222
[58] Field of Search .............. 198/370, 463.2, 463.3, 198/464.3, 465.4, 375, 605; 414/222, 281, 609

[56] References Cited

U.S. PATENT DOCUMENTS

| | | | |
|---|---|---|---|
| 2,998,136 | 8/1961 | Gerisch | 198/465.4 |
| 3,752,339 | 8/1973 | Sullivan et al. | 214/152 |
| 3,884,370 | 5/1975 | Bradshaw et al. | 198/465.4 X |
| 3,889,797 | 6/1975 | Naito et al. | 198/370 X |
| 3,991,685 | 11/1976 | Toby | 198/465.4 X |
| 4,069,764 | 1/1978 | Teyssedre | 198/465.4 X |
| 4,544,318 | 10/1985 | Nagatomo et al. | 414/222 |
| 4,658,947 | 4/1987 | Welder | 198/463.3 X |
| 4,981,408 | 1/1991 | Hughes et al. | 414/222 X |

FOREIGN PATENT DOCUMENTS

| | | | |
|---|---|---|---|
| 1798090 | 12/1970 | Germany . | |
| 2340827 | 3/1975 | Germany | 198/465.4 |
| 3219459 | 1/1987 | Germany . | |
| 3641594 | 6/1987 | Germany . | |
| 3642236 | 8/1987 | Germany . | |
| 0897475 | 1/1982 | U.S.S.R. | 198/465.4 |
| 0897653 | 1/1982 | U.S.S.R. | 198/370 |

OTHER PUBLICATIONS

Mitsubishi Denki Gifo, vol. 63, No. 11, 1989, pp. 120–123.
Nikkei Microdevives, Nov. 1989, pp. 107–123.
Daifuku Clean FA Technology.

*Primary Examiner*—James R. Bidwell
*Attorney, Agent, or Firm*—Townsend and Townsend Khourie and Crew

[57] ABSTRACT

An automatic carrier system provided with first carrier units for carrying an object between two adjacent regions, a second carrier unit for carrying the object between two remote regions, and a transfer unit for transferring the object between the first carrier units and the second carrier unit, so that the object is carried between two optional regions of the plurality of regions and an automatic carrying method using this system. When an object is to be carried between the remote regions, it is detected whether or not the first carrier unit at the region to which the object is carried is usable, so that, only when it is usable, the second carrier unit is used to carry the object.

4 Claims, 9 Drawing Sheets

AUTOMATIC CARRIER SYSTEM AND AUTOMATIC CARRIER METHOD

This is a continuation of application Ser. No. 07/625,728, filed Dec. 4, 1990, now abandoned.

BACKGROUND OF THE INVENTION

1. Field of the Invention

The present invention relates to an automatic carrier system using a plurality of carrier means to automatically carry objects between optional regions and to an automatic carrying method using this automatic carrier system.

2. Description of Related Art

FIG. 1 is a structural plan view of the conventional automatic carrier system, in which reference numerals 3 designate production regions formed by collecting the same kinds of production facilities, and the production regions 3 are disposed in two parallel rows spaced at a predetermined interval. Between the rows of the production regions 3 is provided a track 41 circulating along the production regions 3 in a flat circular manner when planar-viewed. The track 41 is provided above the production regions 3 (or underground) in order to improve work efficiency. On the track 41 are disposed a plurality of carriers 42 circulating along the track 41 in the predetermined direction. Each production region 3 is provided with a delivery unit 32 for delivering the object between each production region 3 and each carrier 42. The carriers 42, when carrying the objects, are adapted to stop in front of the delivery unit 32 at a desired production region 3.

Next, explanation will be given on operation of the automatic carrier system. In a case that the object is carried between the desired production regions 3, the object is carried to the delivery unit 32 at the production regions 3 and it is lifted (or lowered) to the track 41 and transferred to the carrier 42 by the delivery unit 32. The carrier 42 moves toward the delivery unit 32 of the production region 3 to which the object is to be carried, and transfers the object to the delivery unit 32, so that the object is lowered (or lifted) by the delivery unit 32 onto which the object is transferred and it is delivered by a dolly from the delivery unit 32 to the production facility of the production region 3 to which the object is to be carried.

However, the above-mentioned conventional automatic carrier system carries the objects between the production regions 3 entirely through the track 41. Accordingly, the carrying amount by using the carriers 42 is large and there is a fear that the carrying amount exceeds the carrier capacity of each carrier 42, thereby creating the problem that many objects waiting to be carried remain and the number of unfinished objects increases to extend a manufacturing period.

SUMMARY OF THE INVENTION

An object of the present invention is to provide an automatic carrier system and an automatic carrying method, in which the carrying amount between the regions does not exceed the carrying capacity of carrier means.

Another object of the present invention is to provide an automatic carrier system and an automatic carrying method, which can carry objects without delay.

Still another object of the present invention is to provide an automatic carrier system and an automatic carrying method, which have carrier means of less carrying load.

Yet another object of the present invention is to provide an automatic carrier system and an automatic carrying method, which can largely reduce the number of unfinished objects in comparison with the conventional one.

The automatic carrier system of the present invention is provided with first carrier means for carrying an object between two adjacent regions, second carrier means for carrying the object between two remote regions, and transfer means for transferring the object between the first and second carrier means. The first carrier means only is used for carrying the object between two adjacent regions, the first and second carrier means being used for carrying the object between two remote regions. Concretely, the object is transferred to the second carrier means through the first carrier means of the region at the carrying-out side, the second carrier means carries the object to the first carrier means of the region at the carrying-in side, and the object is transferred to the first carrier means from the second carrier means, thereby carrying the object to the region at the carrying-in side.

When the object is carried between two remote regions, it is detected whether or not the first carrier means of the region at the carrying-in side is usable, so that, only when the first carrier means is usable, the second carrier means is used to carry the object between the remote regions, thereby preventing the object from staying on the way of carrying.

The above and further objects and features of the invention will more fully be apparent from the following detailed description with accompanying drawings.

DESCRIPTION OF THE PREFERRED EMBODIMENTS

The present invention will be concretely described in accordance with the drawings showing an embodiment thereof.

Figure 1:
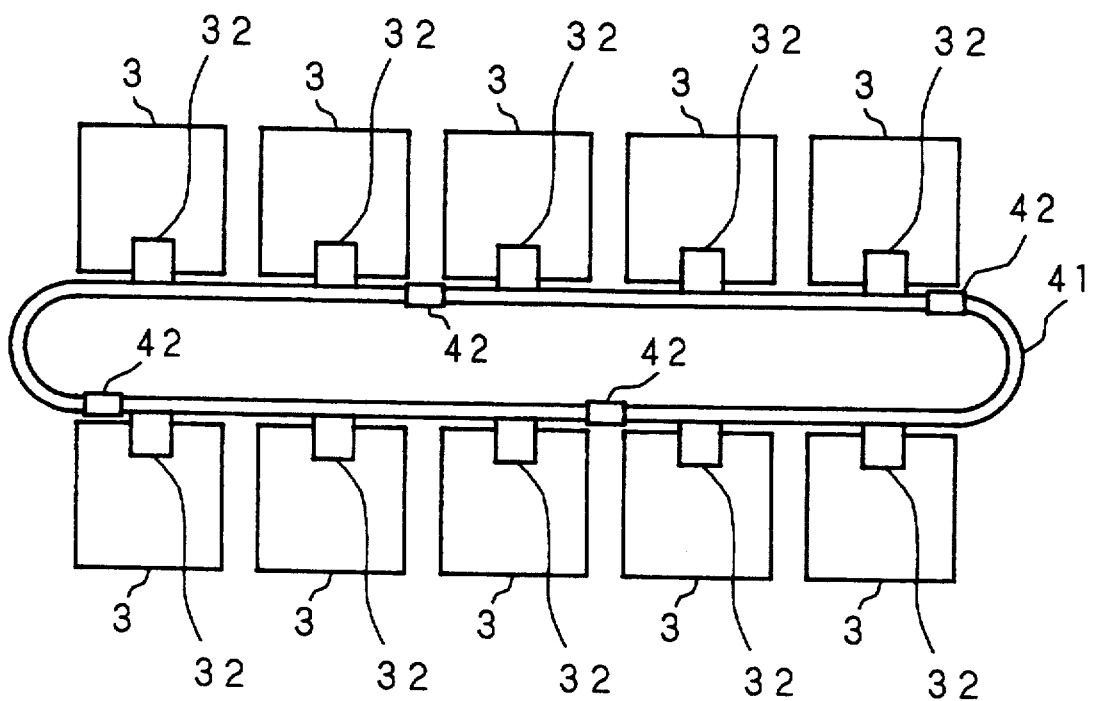
FIG. 1 is a typical plan view of construction of the conventional automatic carrier system.
Figure 2:
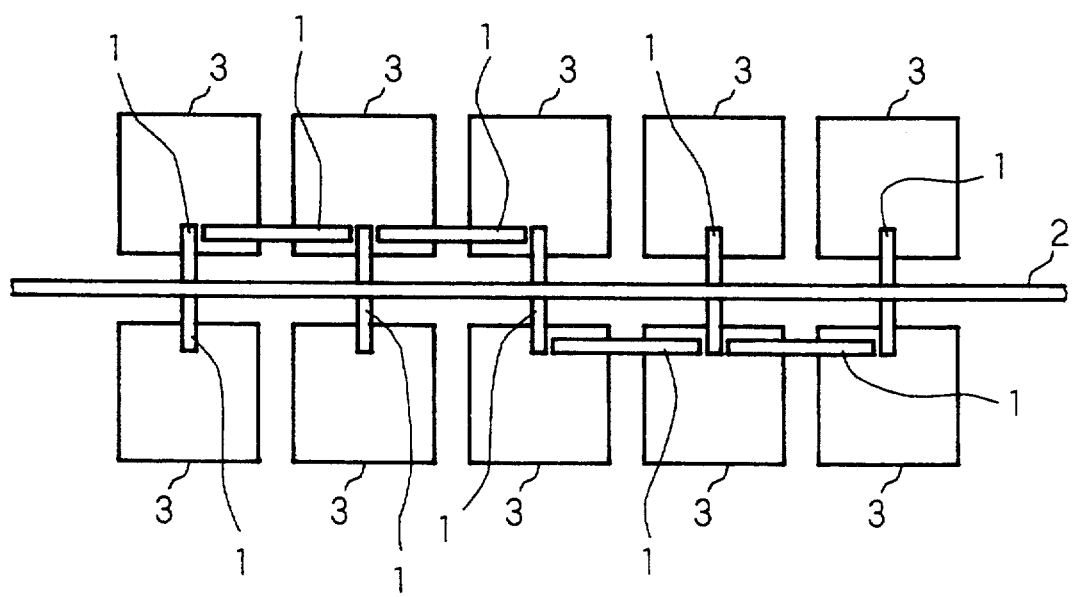
FIG. 2 is a typical plan view of construction of an automatic carrier system of the present invention.
Figure 3:
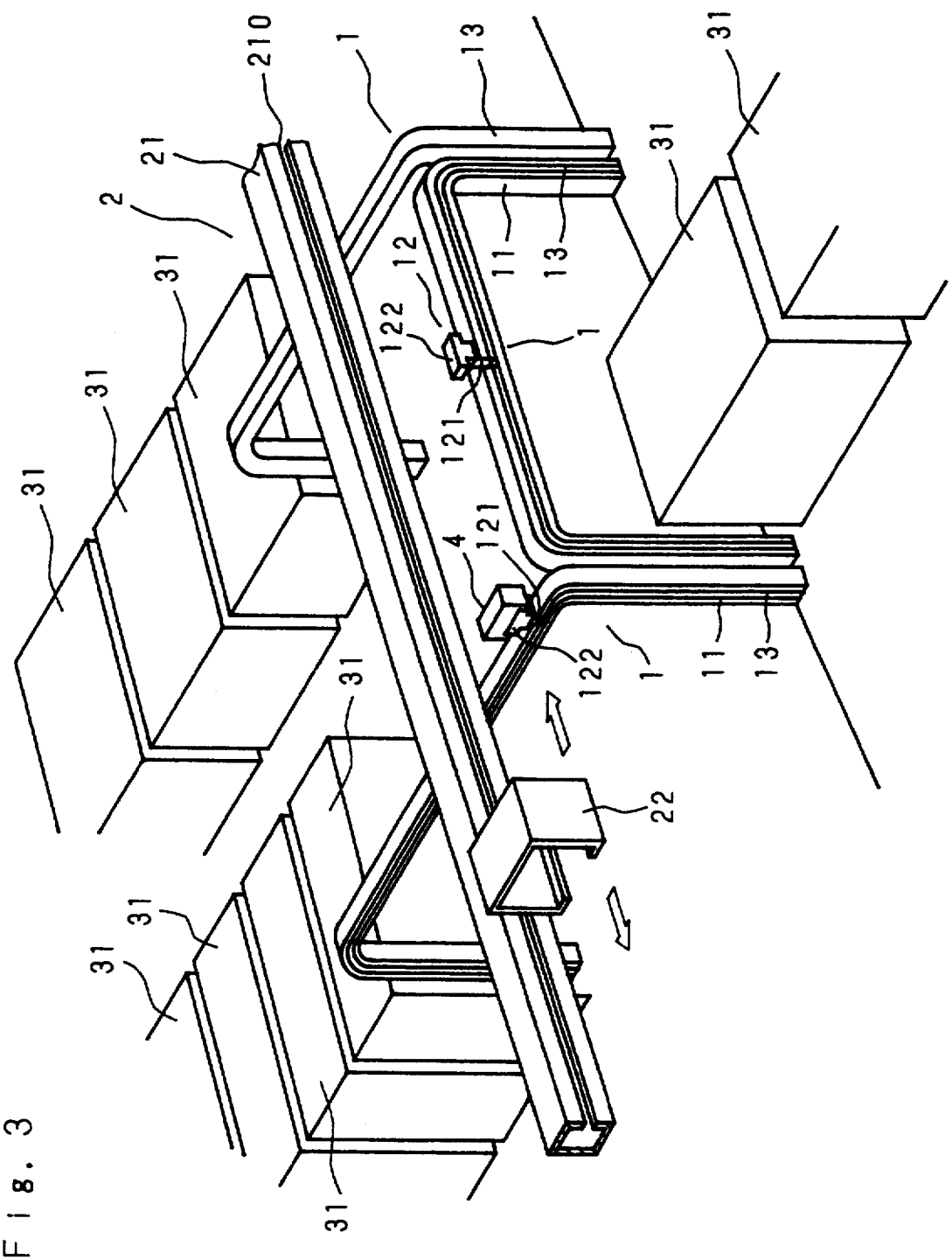
FIG. 3 is a typical perspective view thereof.

Referring to FIGS. 2 and 3, reference numerals 3 designate production regions formed by collecting the same kinds of production facilities 31, the production regions 3 being disposed in two parallel rows spaced at a predetermined interval from each other. Between the adjacent production regions 3 of the juxtaposed production regions 3 are disposed first carrier units 1 for carrying objects 4, such as unfinished works to be carried, between these production regions 3. Each first carrier unit 1 comprises a gantry-like bridge member 11 mounted across the adjacent production regions 3 and a first carrier 12 moving along the bridge member 11 while loading the object 4. Above the space between the rows of production regions 3 is provided a second carrier unit 2 for carrying the object 4 of unfinished work between remote production regions 3. The second carrier 2 comprises a track 21 provided above the space between the rows of production regions 3 and extending in parallel thereto and a second carrier 22 loading thereon the object 4 and moving along the track 21. In addition, the object 4 is carried by an unmanned dolly (not shown) between the production facilities 31 in the respective production regions 3, and a loading robot (not shown) is adopted to transfer the object 4 from the unmanned dolly to the first carrier unit 1 and vice versa.

Figure 4:
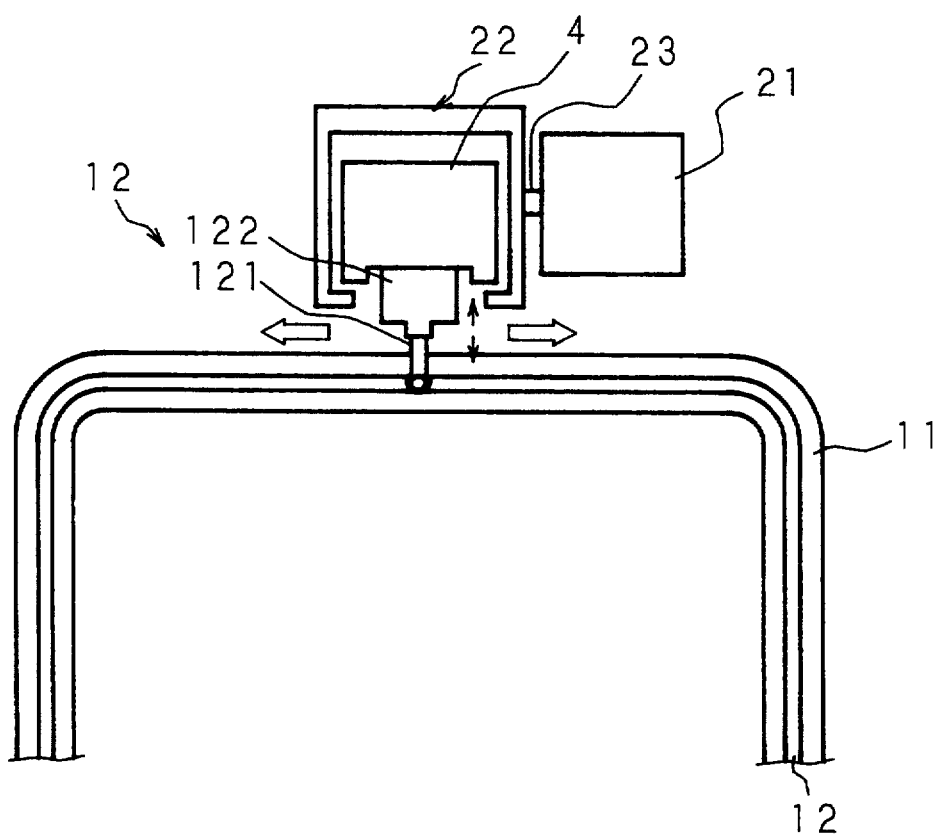
FIG. 4 is an enlarged front view of a first carrier unit.
Figure 5:
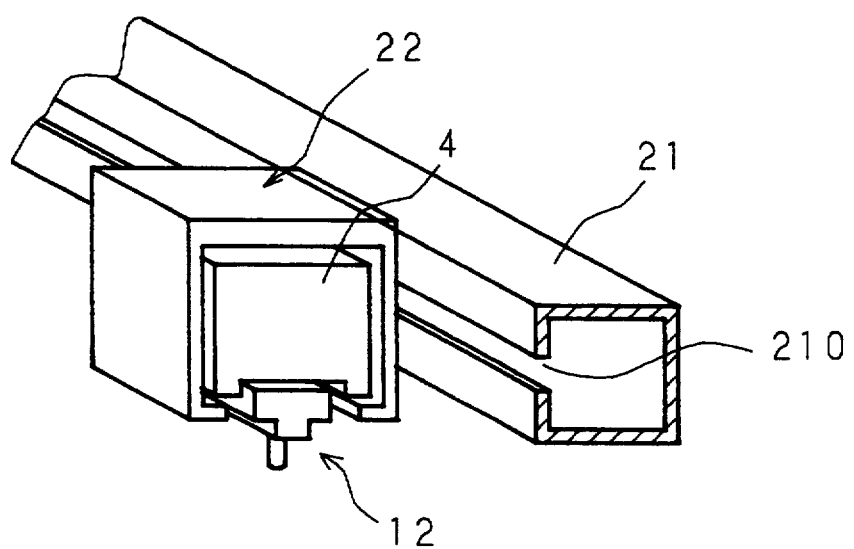
FIG. 5 is a partially enlarged perspective view of a second carrier unit.

Referring to FIGS. 4 and 5, at the front of each bridge member 11 is provided a groove 13 extending at the widthwise center of bridge member 11 along its gantry shape and a first driving unit (not shown) for moving the first carrier 12 along the groove 13 is provided within the bridge member 11. The first carrier 12 comprises a loading table 122 being rectangular when planar-viewed and loading thereon the object 4 and a rod-like support member 121 mounted below the loading table 122 and supporting it vertically telescopically. The support member 121 is mounted at one end portion thereof to the first driving unit in the bridge member 11 so that the first carrier 12 is adapted to move along the groove 13 at the bridge member 11. Also, the track 21 is formed of a hollow member being rectangular in section and having at one side a groove 210 extending in the lengthwise direction of the hollow member, and inside the track 21 is provided a second driving unit (not shown) connected to the second carrier 22 and moving along and inside the track 21 by an electromagnetic force. The second carrier 22 is formed of a square box-like frame member which is cutout at the widthwise center of the bottom in a manner of being somewhat longer in width than the loading table 122 and extending in parallel to the track 21. A rod-like connecting member 23 is mounted at one end portion thereof to one side-surface of frame member and at the other end to the second driving unit through the groove 210. Thus, the second carrier 22 is connected to the second driving unit so as to be movable along the track 21.

When the object 4 is carried between two adjacent production regions 3, the first carrier units 1 only are used, and, when it is carried between two remote production regions 3, the first carrier units 1 and the second carrier unit 2 are used to carry the object 4 in a manner of sequentially relaying to these units.

Figure 6:
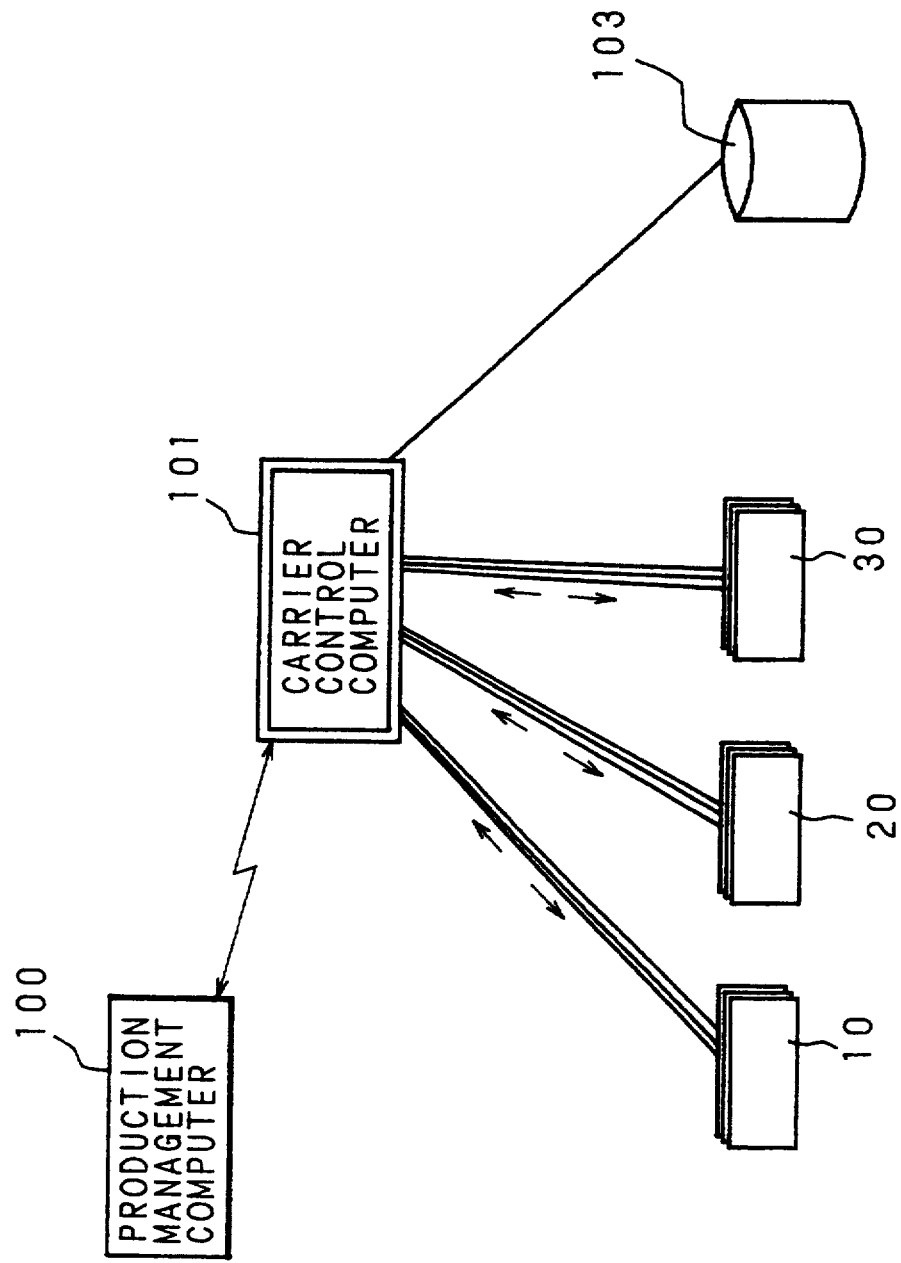
FIG. 6 is a block diagram of a control system for controlling the automatic carrier system of the invention.

Referring to FIG. 6, reference numeral 101 designates a carrier control computer for performing carrier control of the object 4 to be carried. The carrier control computer 101 has a data base 103 storing therein a concrete carrying route of every object 4 by using the first carrier units 1 and the second carrier unit 2 and is connected to a production management computer 100 for performing the production management. While referring to the data base 103 on the basis of the information of the object 4, equipment at the carrying-out side and that at the carrying-in side, the carrier control computer 101 gives a control signal to a first carrier control unit 10 for controlling drive of the first carrier units 1, to a second carrier control unit 20 for controlling drive of the second carrier unit 2, and to a carrier control unit 30 in production region for controlling operation of the unmanned dolly and loading robot in the respective production regions 3. When the first carrier control unit 10, the second carrier control unit 20 and the carrier control unit 30 in production region execute operations based on the control signal given from the carrier control computer 101, each of them reports the execution to the carrier control computer 101.

Figure 7:
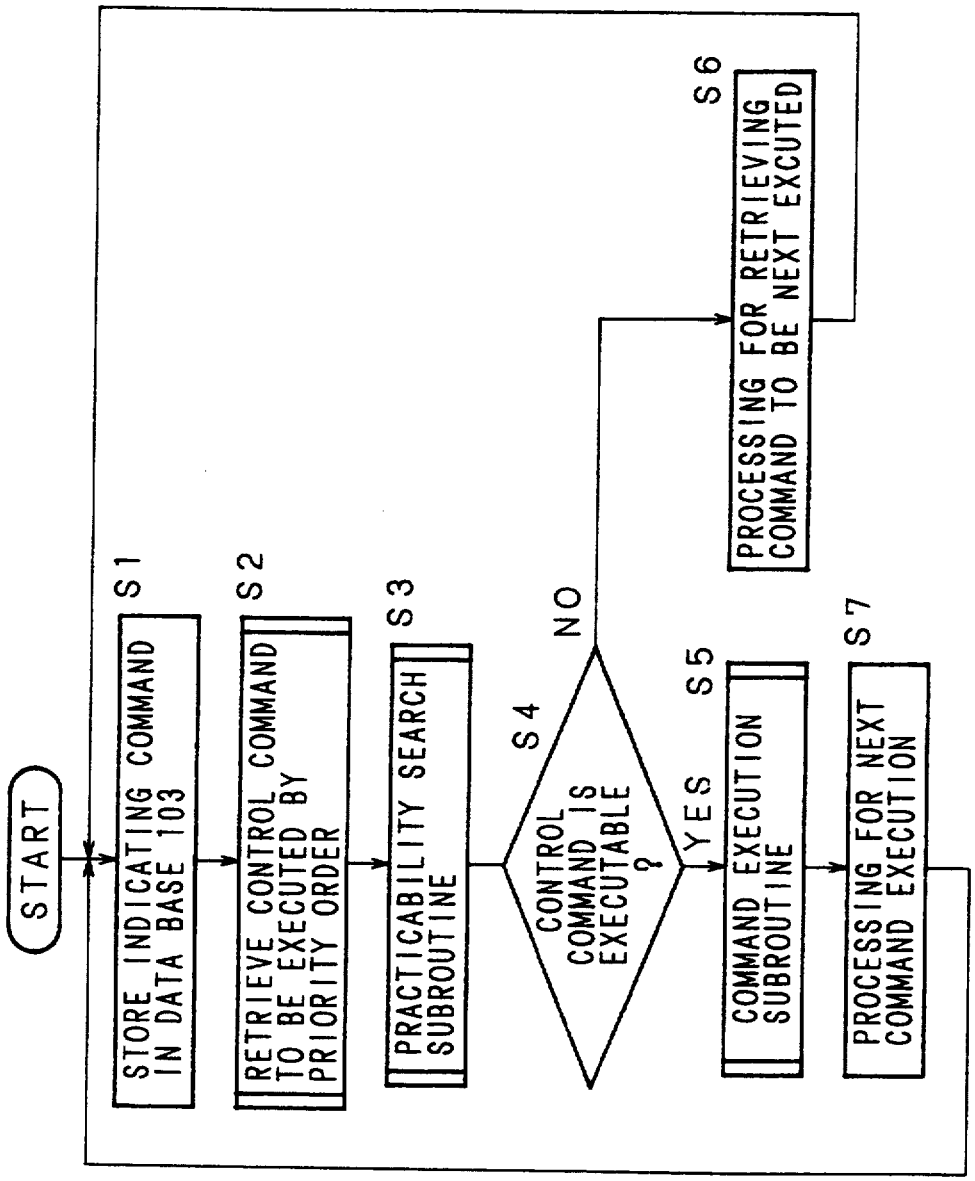
FIG. 7 is a flow chart showing a main routine for automatic carrying control of the invention.
Figure 8:
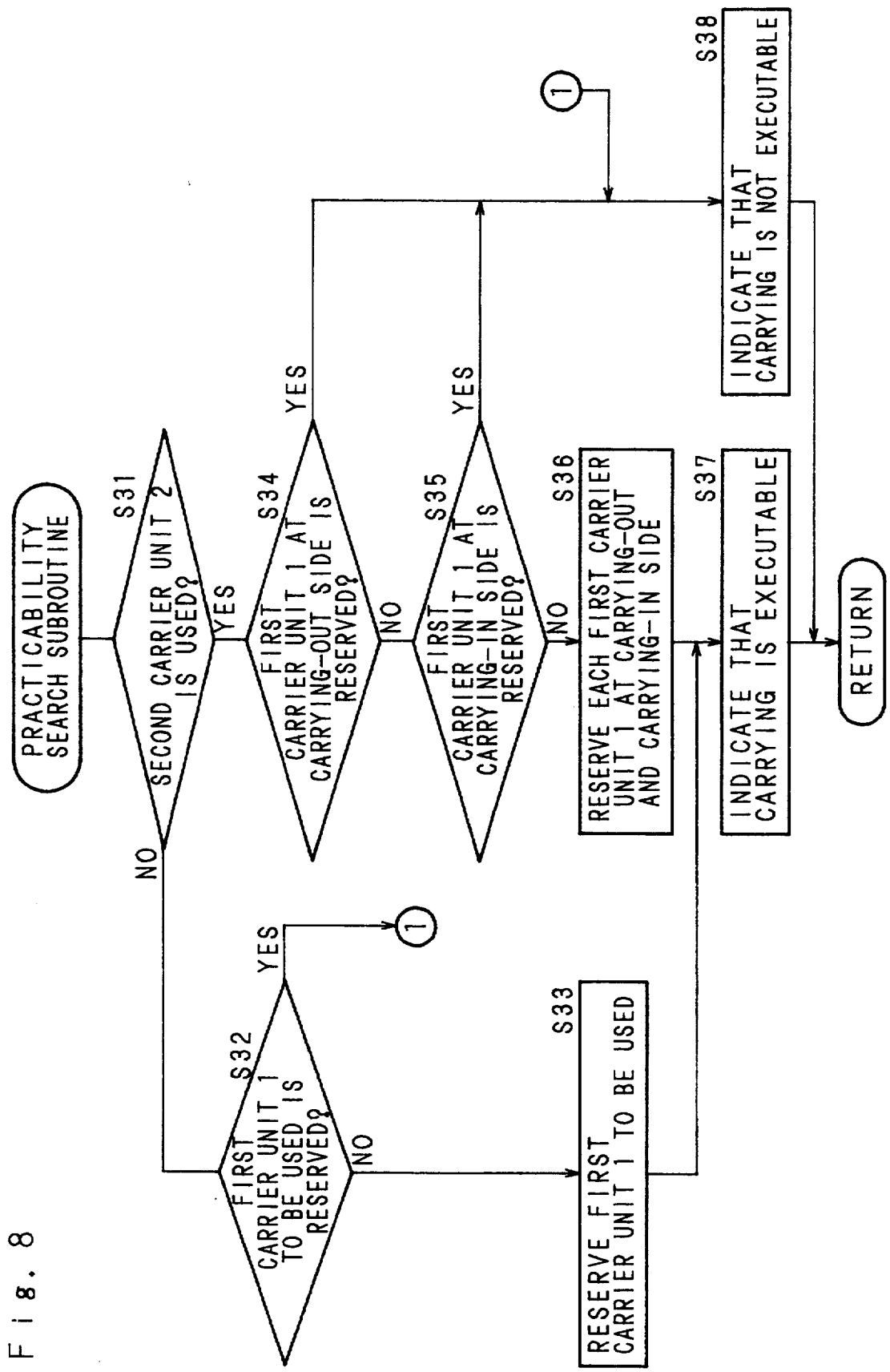
FIG. 8 is a flow chart showing a practicability search subroutine of a command.
Figure 9:
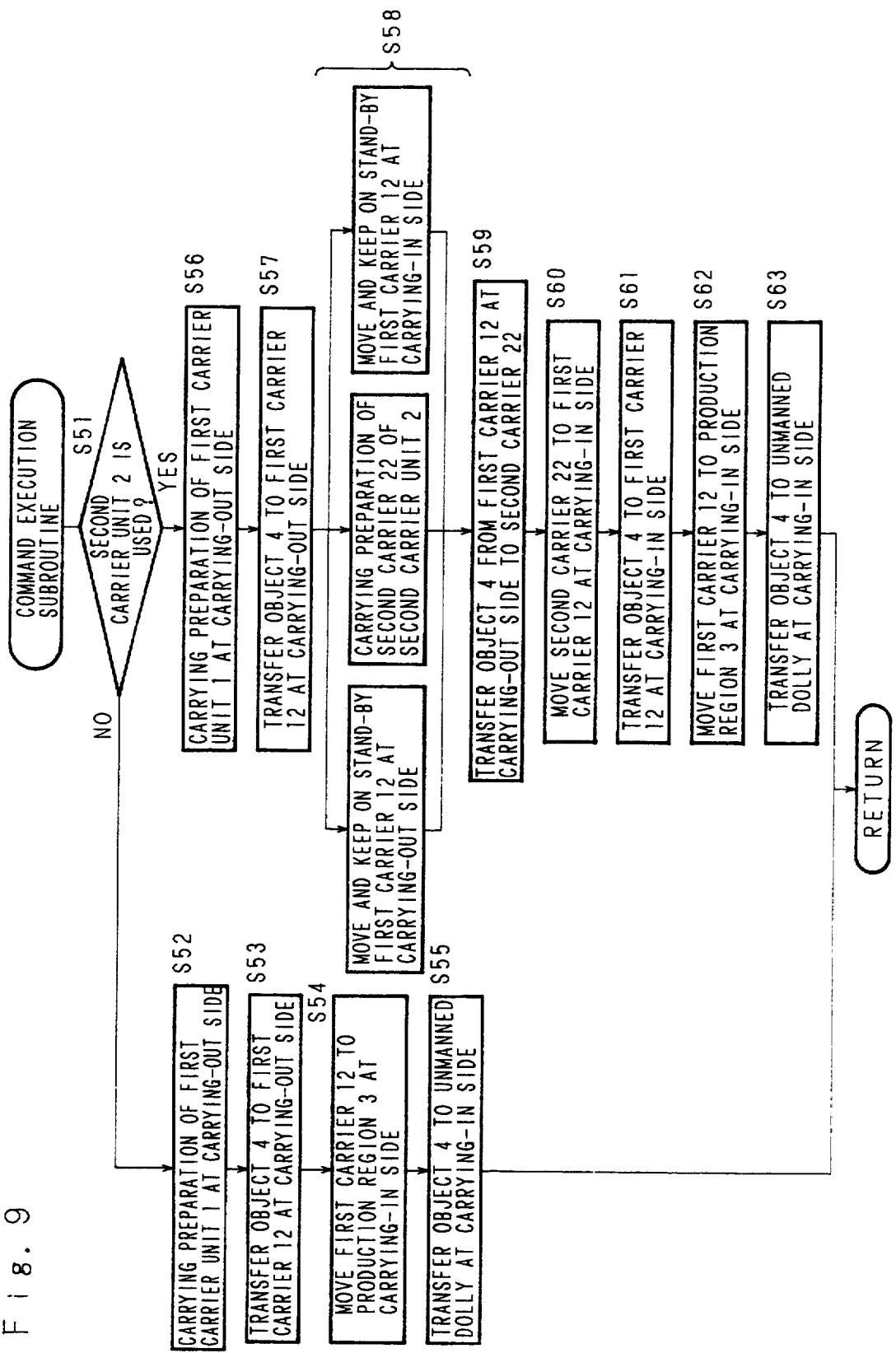
FIG. 9 is a flow chart showing a command execution subroutine.

Next, explanation will be given on a control method for the above-mentioned automatic carrier system in accordance with the flow charts in FIGS. 7, 8 and 9 showing the procedure thereof.

At first, a command for indicating the name of object 4 to be carried, facilities at the carrying-out side, and those at the carrying-in side, given from the production management computer 100 is stored in the data base 103 (in a step S1). Within the data base 103, a plurality of not-executed control command therein are given the order of priority in accordance with the predetermined rule, such as the first-come rule, on the basis of the instruction command, to thereby retrieve the control command to be executed according to the priority order (in a step S2). Upon determining the control command to be executed, the procedure advances to a practicability search subroutine to thereby inspect the carrying practicability related to the control command (in a step S3).

At the practicability search subroutine shown in FIG. 8, it is detected whether or not the carrying related to the control command to be executed uses the second carrier unit 2 (in a step S31). When it is detected that the second carrier unit 2 is not used, it is decided whether or not the first carrier unit 1 to be used has a reservation to carry another object 4 (in a step S32). When the first carrier unit 1 has a reservation, it is indicated that the carrying related to the control command is not executable (in a step S38) and the procedure returns. When the first carrier unit 1 has no reservation, the first carrier unit 1 to be used is reserved (in a step S33) and it is indicated that the carrying related to the control command is executable (in a step S37) and the procedure returns.

In the step S31, when it is detected that the carrier related to the control command to be executed uses the second carrier unit 2, it is decided whether or not the first carrier unit 1 at the carrying-out side has a reservation to carry another object 4 (in a step S34). When the first carrier unit 1 has a reservation, it is shown that the carrying related to the control command is not executable (in the step S38) and procedure returns. When the first carrier unit 1 at the carrying-out side has no reservation, it is decided whether or not the first carrier unit 1 at the carrying-in side has a reservation to carry another object 4 (in a step S35). When the first carrier unit 1 at the carrying-in side has a reservation, it is indicated that the carrying related to the control command is not executable (in the step S38) and the procedure returns. When the first carrier unit 1 at the carrying-in side has no reservation, the use of the first carrier units 1 to be used both at the carrying-out side and at the carrying-in side is reserved (in a step S36) and it is indicated the carrying related to the control command is executable (in the step S37) and the procedure returns.

Upon ending the practicability search subroutine, it is decided on the basis of search result thereof whether or not the control command is executable (in a step 4). When not executable, processing for retrieving the command to be next executed is performed (in a step S6) and the procedure returns to the step S1. When executable, the procedure advances to a command execution subroutine so as to execute the command (in a step S5).

At the command execution subroutine shown in FIG. 9, at first, it is detected whether or not the carrying related to the executed control command uses the second carrier unit 2 (in a step S51). When it is detected that the second carrier unit 2 is not used, the object 4 is carried from the production facility 31 in the production region 3 at the carrying-out side to an end of the first carrier unit 1 by the unmanned dolly and the first carrier 12 of the first carrier unit 1 is moved to the position where the object 4 can be transferred to the first carrier 12, thereby performing carrying preparation of the first carrier unit 1 at the carrying-out side (in a step S52). The loading robot is used to put the object 4 on the loading table 122 at the first carrier 12 (in a step S53). The first carrier 12 is moved along the groove 13 to the production region 3 at the carrying-in side and carries the object 4 (in a step S54). When the object 4 arrives at the carrying-in side, the loading robot transfers the object 4 to the unmanned dolly at the carrying-in side, so that the object 4 is carried to the production facility 31 at the carrying-in side by use of the unmanned dolly (in a step S55).

In the step S51, when it is detected that the carrying related to the executed control command uses the second carrier unit 2, the object 4 is carried by the unmanned dolly from the production facility 31 in the production region 3 at the carrying-out side to the end of the first carrier unit 1 at the carrying-out side, and the first carrier 12 of the first carrier unit 1 at the carrying-out side is moved to the position where the object 4 can be transferred, thereby performing carrying preparation of the first carrier unit 1 at the carrying-out side (in a step S56). The loading robot is used to put the object 4 on the loading table 122 at the first carrier 12 (in a step S57). The first carrier 12 at the carrying-out side is moved just below the moving route of the second carrier 22, the support member 121 of first carrier 12 is extended upwardly to lift the loading table 122, the object 4 thereon is lifted, and the first carrier 12 at the carrying-out side is on stand-by at the position of object 4. The second carrier 22 of second carrier unit 2 is ready to move, and the first carrier 12 of first carrier unit 1 at the carrying-in side is moved just below the moving route of second carrier 22 and is on standby thereat (in a step S58). The second carrier 22 is moved to the position where the first carrier 12 at the carrying-out side is on stand-by, and, as shown in FIG. 4, the second carrier 22 is stopped in the state that the object 4 on the loading table 122 can be contained into the second carrier 22. In such state, the support member 121 of first carrier 12 is contracted to lower the loading table 122 so that the object 4 is transferred within the second carrier 22 (in a step S59). When the object 4 is transferred within the second carrier 22, the second carrier 22 is moved to the stand-by position of the first carrier 12 of first carrier unit 1 at the carrying-in side and is stopped in the state that it is positioned just above the first carrier 12 at the carrying-in side (in a step S60). Next, the support member 121 of first carrier 12 at the carrying-in side is extended upwardly to lift the loading table 122, so that the object 4 is placed thereon, without keeping contact with the second carrier 22 (in a step S61). After the second carrier 22 is moved to the position where it is spaced apart from the moving route of first carrier 12 at the carrying-in side, the first carrier 12 loading thereon the object 4 is moved to the production region 3 at the carrying-in side (in a step S62). Upon arrival of the first carrier 12 at the production region 3 at the carrying-in side, the loading robot thereof transfers the object 4 from the loading table 122 of the first carrier 12 to the unmanned dolly (in a step S63). The unmanned dolly carries the object 4 to the objective production facility 31.

When the either processing in the step S55 or S63 ends, the procedure is returned to the main routine. The above-mentioned command execution subroutine is adapted to be subjected to multitask operation, so that, when the control command of one task starts execution, the procedure advances to the step S7 and is ready for the next command execution and returns to the step S1. Then, the above-mentioned processing is carried out so that the control command formerly starting execution and that later starting execution are multiprocessed.

The above-mentioned carrying method, in a case of carrying the object 4 between two adjacent production regions 3, uses the first carrier unit 1 only for carrying, so that the object 4 need not relay the plurality of carrier units. Therefor this method makes it possible to carry the object 4 in a short time and reduces a waiting time for the object 4 to be carried. In the conventional automatic carrying system, each production region 3 is provided with one delivery unit 32 at which the carrier 42 stops. The delivery units 32 are so many that the carrying control method is complicated. This embodiment, however, is adapted to stop the second carrier 22 at the first carrier units 1 provided between two adjacent production regions 3 (one unit is provided between two production regions 3). Since the place where the second carrier 22 is to be stopped is more restricted than the conventional one, the control method for the second carrier unit 2 to perform carrying between two remote production regions 3 is simple. The construction of the second carrier 22 at the second carrier unit 2 and the first carriers 12 at the first carrier units 1 as this embodiment need not provide an apparatus for transferring the object 4 from the first carrier units 1 to the second carrier unit 2 and vice versa, whereby the cost of equipment is low and maintenance thereof is easy.

The first carrier units 1 and the second carrier unit 2 are provided above the production regions 3 in this embodiment, these units, however, may be provided under ground. Thus, when the first carrier units 1 and second carrier unit 2 are provided above the production regions 3 or under ground, the work efficiency in the production regions 3 is superior.

Also, this embodiment refers to carrying an object between the production regions, however the present invention may of course be applied to carrying the object between the production region and the inspection region for carrying out the qualification test, or between the inspection regions.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An automatic carrier system for carrying objects between ones of a plurality of production regions in a manufacturing environment, said automatic carrier system comprising:

- a plurality of production regions, disposed in parallel rows and spaced at predetermined intervals from each other, the relation between any pair of production regions being user definable either as adjacent or as remote;
- a plurality of gantry-like bridge members, each adapted to span the space between the transfer points of two adjacent ones of said plurality of production regions;
- a plurality of first carrier means, each adapted to travel across one of said gantry-like bridge members, for carrying objects between adjacent ones of said plurality of production regions;
- a track, mounted above the space between, and extending parallel to, said rows of production regions; and
- second carrier means, adapted to travel on said track, for carrying objects between ones of said first carrier means, such that objects are carried between adjacent production regions by way of one of said first carrier means, while objects are carried between remote production regions by way of said second carrier means carrying objects between ones of said first carrier means.

2. The automatic carrier system of claim 1 wherein said plurality of third carrier means comprises a plurality of unmanned dollies.

3. The automatic carrier system of claim 1 wherein said plurality of transfer means comprises a plurality of loading robots.

4. An automatic carrier system for carrying objects between ones of a plurality of production regions in a manufacturing environment, said automatic carrier system comprising:

- a plurality of production regions, disposed in parallel rows and spaced at predetermined intervals from each other, the relation between any pair of production regions being user definable either as adjacent or as remote;
- a plurality of production facilities, disposed within each of said production regions;
- a plurality of gantry-like bridge members, each adapted to span the space between two adjacent ones of said plurality of production regions.
- a plurality of first carrier means, each adapted to travel across one of said gantry-like bridge members, for carrying objects between adjacent ones of said plurality of production regions;
- a track, mounted above the space between, and extending parallel to, said rows of production regions;
- second carrier means, adapted to travel on said track, for carrying objects between ones of said first carrier means;
- a plurality of third carrier means, for carrying objects between said production facilities within said production region; and
- a plurality of transfer means, for transferring objects bidirectionally between one of said third carrier means and one of said first carrier means.

* * * * *